United States Patent
Zolotnitsky et al.

(10) Patent No.: US 6,673,866 B2
(45) Date of Patent: Jan. 6, 2004

(54) THERMOPLASTIC COMPOSITIONS OF FLUOROPOLYMERS

(75) Inventors: Mikhail Zolotnitsky, Jamison, PA (US); Julio A. Abusleme, Varese (IT)

(73) Assignee: Ausimont S.p.A., Milan (IT)

( * ) Notice: Subject to any disclaimer, the term of this patent is extended or adjusted under 35 U.S.C. 154(b) by 53 days.

(21) Appl. No.: 09/962,353

(22) Filed: Sep. 26, 2001

(65) Prior Publication Data

US 2002/0058736 A1 May 16, 2002

(30) Foreign Application Priority Data

Sep. 27, 2000 (IT) ..................... MI2000A2093

(51) Int. Cl.[7] .............................................. C08F 27/12
(52) U.S. Cl. ................ 524/570; 524/401; 524/404; 524/414; 524/430; 524/432; 524/544; 525/326.3
(58) Field of Search ................ 524/404, 432, 524/401, 430, 544, 570; 525/326.3

(56) References Cited

U.S. PATENT DOCUMENTS

| | | | |
|---|---|---|---|
| 3,763,222 A | 10/1973 | Aronoff et al. | 260/475 |
| 3,840,619 A | 10/1974 | Aronoff et al. | 260/878 |
| 4,039,631 A | 8/1977 | Robertson et al. | 260/878 |
| 4,121,001 A | 10/1978 | Gotcher et al. | 428/35 |
| 4,680,324 A | * 7/1987 | Malwitz | 524/58 |
| 5,182,325 A | * 1/1993 | Claesen et al. | 524/404 |
| 5,612,419 A | * 3/1997 | Arcella et al. | 525/252 |
| 6,359,230 B1 | * 3/2002 | Hildreth | 174/110 R |
| 6,369,130 B1 | * 4/2002 | Zolotnitsky et al. | 523/210 |

FOREIGN PATENT DOCUMENTS

| | | | |
|---|---|---|---|
| EP | 0 866 079 | 9/1998 | C08F/214/18 |
| EP | 906934 | * 4/1999 | |
| EP | 0 906 934 | 4/1999 | C08K/13/02 |
| EP | 1 125 982 | 8/2001 | C08L/27/12 |
| EP | 1 130 056 | 9/2001 | C08L/27/00 |

* cited by examiner

Primary Examiner—David W. Wu
Assistant Examiner—Henry Hu
(74) Attorney, Agent, or Firm—Finnegan, Henderson, Farabow, Garrett & Dunner, L.L.P.

(57) ABSTRACT

A polymer composition formed by:

I) fluoropolymers selected from one or more of the following: copolymers based on ethylene, TFE and/or CTFE modified with hydrogenated monomers, or blends of these fluoropolymers with PCTFE; said fluoropolymers and/or the corresponding blends optionally mixed with hydrogenated plasticizers;

II) one or more inorganic fire-retardants, treated and not with dispersing agents;

III) one or more crosslinking agents;

IV) optional additives.

30 Claims, No Drawings

THERMOPLASTIC COMPOSITIONS OF FLUOROPOLYMERS

The present invention relates to thermoplastic compositions of fluoropolymers having a reduced smoke release when subjected to a heat source. Said thermoplastic compositions are used in the "plenum wire insulation" and "cable jacketing" field, where lower and lower values of "average smoke" and "peak smoke" according to the UL910 Steiner Tunnel test are required.

More specifically the present invention relates to thermoplastic compositions of fluoropolymers of ethylene (E) with tetrafluoroethylene (TFE), and/or chlorotrifluoroethylene (CTFE), modified with one or more hydrogenated monomers.

Said fluoropolymers are used in the manufacture of flexible cables. An essential feature of these fluoropolymers consists in that they do not show a "necking at yield" on the stress-strain curve, thus avoiding the "whitening" effect on the bent cable, which visually represents the permanent plastic deformation suffered by the material.

From EP 866, 079 in the name of the Applicant, copolymers of ethylene with tetrafluroethylene and/or chlorotrifluoroethylene, modified with hydrogenated monomers, are known, the flexibility (low elastic modulus) is conferred by formulating them in compositions comprising hydrogenated plasticizers. These compositions when subjected to a heat source show a substantial decrease of smoke when the inorganic fire-retardants described in EP 906,934 in the name of the Applicant.

However in the various industrial applications, for example cable jacketing, compositions with lower and lower smoke emissions are required for clear safety reasons. Furthermore the rules regulating smoke emission become more and more restrictive in various Countries.

Therefore a further lowering of the "average smoke" and "peak smoke" values with respect to the materials of the prior art is desired and required by the cable industry.

The need was felt to have available fluorinated polymer compositions based on ECTFE or ETFE, showing a reduced smoke release, determined as "average smoke" and as "peak smoke" according to UL910 Steiner Tunnel, with respect to those of the prior art, so that it were possible to use said compositions as jacketing in cables containing primary cables formed of various materials (hydrogenated polymers, for example polyethylene, and/or fluorinated polymers, for example TFE-hexa-fluoropropene copolymers (FEP)) which were more reliable in case of fire.

The Applicant has surprisingly and unexpectedly found that by using in polymer compositions comprising ECTFE or ETFE polymers modified with hydrogenated monomers, fire-retardants agents together with crosslinking agents, it is possible to obtain compositions having a lower smoke release, determined both as "average smoke" and as "peak smoke" (UL910 Steiner Tunnel), with respect to those of the compositions of the prior art.

An object of the present invention is a polymer composition formed by:

I) fluoropolymers selected from one or more of the following: copolymers based on ethylene, TFE and/or CTFE, modified with hydrogenated monomers, or blends of these fluoropolymers with homopolymers of CTFE or (co)polymers based on CTFE (PCTFE) containing at least 99% by moles of CTFE, the complement to 100 being one or more fluorinated monomers or hydrogenated monomers; said fluoropolymers and/ or the corresponding blends optionally mixed with hydrogenated plasticizers;

II) one or more inorganic fire-retardants, optionally treated with dispersing agents;

III) one or more crosslinking agents;

IV) optional additives such as fillers, "intumescent agents", pigments, lubricants, organic "fire-retardants" and thermal stabilizers.

More specifically the fluoropolymers component I) of the composition object of the invention are formed by the following monomers:

(a) ethylene from 10 to 70%, preferably from 35 to 55% by moles;

(b) a fluorinated monomer selected from tetrafluoroethylene, chlorotrifluoroethylene, or mixtures thereof, in a percentage by moles in the range 30–90%, preferably 45–65%;

(c) from 0.1 to 30%, preferably from 1 to 15%, by moles with respect to the total amount of (a)+(b), of a hydrogenated monomer of formula:

$$CH_2=CH-(CH_2)_n-R_1 \qquad (I)$$

wherein $R_1=-OR_2$, $-(O)_tCO(O)_pR_2$ wherein t and p are integers equal to 0 or 1, and $R_2$ is a hydrogenated radical from 1 to 20 carbon atoms, linear and/or branched, or cycloalkyl, $C_1-C_{20}$ alkyl radical, or $R_2$ is H. The $R_2$ radical can optionally contain: heteroatoms preferably Cl, O, N; one or more functional groups preferably selected from OH, COOH, epoxide, ester and ether; and double bonds; n is an integer in the range 0–10. Preferably $R_2$ is an alkyl radical from 1 to 10 carbon atoms containing one or more hydroxide functional groups and n is an integer in the range 0–5.

The comonomers (c) are for example selected from the following classes:

1) Acrylic monomers of formula:

$$CH_2=CH-CO-O-R_2$$

wherein $R_2$ has the above mentioned meaning.

Among the monomers which have the formula reported in 1) can be mentioned for example: ethylacrylate, n-butylacrylate, acrylic acid, hydroxyethylacrylate, hydroxypropylacrylate, (hydroxy) ethylhexylacrylate, acryl (N-alkyl) amide wherein alkyl is $C_1-C_5$, etc.

2) Vinylether monomers of formula:

$$CH_2=CH-O-R_2$$

wherein $R_2$ has the above mentioned meaning.

Among the monomers which have the formula reported in 2) can be mentioned for example: propylvinylether, cyclohexylvinylether, vinyl-4-hydroxybutylether, etc.

3) Vinyl monomers of the carboxylic acid of formula:

$$CH_2=CH-O-CO-R_2$$

wherein $R_2$ has the above mentioned meaning.

Among the monomers which have the formula reported in 3) can be mentioned for example: vinyl-acetate, vinylpropionate, vinyl-2-ethylhexanoate, etc.

4) Unsaturated carboxylic acids of formula:

$$CH_2=CH-(CH_2)_n-COOH$$

wherein n has the above mentioned meaning. Vinylacetic acid, etc. can for example be mentioned.

The preferred class of monomers (c) are acrylic monomers 1), the most preferred is n-butyl acrylate.

The preferred fluorinated monomer (b) is chlorotrifluoroethylene.

The PCTFE percentage in the blends is in the range 1–75% by weight, preferably 5–30% by weight.

The PCTFE is a semicrystalline (co)polymer of chlorotrifluoroethylene (CTFE) containing at least 99% by moles of chlorotrifluoroethylene where the complement to 100% is formed by one or more hydrogenated monomers, preferably acrylic, or fluorinated monomers, preferably selected from (per)fluoroalkylvinylethers, (per)fluorodioxoles. Preferably the PCTFE is the CTFE homopolymer.

PCTFE and PCTFE blends with the copolymers based on ethylene, TFE and/or CTFE modified with hydrogenated monomers, are obtained according to European patent applications No. 01101784.5 and No. 01101785.2 in the name of the Applicant, herein incorporated by reference.

As component I) fluoropolymers in blend with PCTFE are preferred.

The hydrogenated plasticizers used in mixture with the fluoropolymers component I) of the present invention are those of the prior art, which are used in mixture with hydrogenated (co)polymers; their percentage by weight, based on the total weight of the composition of the present invention, is in the range 0.1–10%, preferably 0.5–5%.

Non limitative examples of said plasticizers are the following: 2-ethylhexyldiphenylphosphate, neopentyl glycoldibenzoate, tricresylphosphate, acetyl-tri-n-butyl citrate (Citroflex® A4), tributyl trimellitate, tetrabromophthalic ester, tri-n-hexyl-trimellitate (Morflex®560), ethylene glycol monostearate, acetyl-tri-n-hexyl citrate, di-butoxyethyl adipate (Plasthall®203); the following are preferred: acetyl-tri-n-butyl citrate, tributyl trimellitate, tri-n-hexyl-trimellitate, di-butoxyethyl adipate.

The "fire retardants" component II) of the composition of the invention are inorganic compounds and their percentage by weight is in the range 0.1–35%, preferably 0.5–15% based on the total weight of the composition.

Examples of these components are inorganic phosphates (for example ammonium phosphate), metal oxides (for example aluminum oxide, trihydrate aluminum oxide, antimony oxides, molybdenum oxide, zinc oxide), tin oxalates, boron compounds (for example borax, zinc borate, Firebrake®ZB), metal hydroxides, for example magnesium hydroxide, $ZnSn(OH)_6$, etc.

Preferably component II) is treated with dispersing agents.

The preferred dispersing agents according to the present invention are those having the general formula

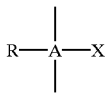

wherein A is an atom selected from Si, Ti or Zr, X is a hydrolyzable group, the two free valences being saturated with R or X, R is an oligomer of hydrogenated monomers, or R is equal to $R_3$, $R_3$ being an alkyl $C_1$–$C_{15}$ and/or aryl radical $C_6$–$C_{15}$. The $R_3$ radical can optionally contain: unsaturations; one or more heteroatoms selected from O, N, S, Cl; functional groups such as for example amines, epoxide, —SH, —OH, —$CONH_2$, carboxyl or salified carboxyl.

The preferred dispersing agents, in monomeric or oligomeric form, have the following structure:

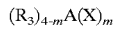

wherein m=1–3, preferably m=2 or 3; X is an hydrolyzable group, preferably X is an alkoxy group $OR_4$ wherein $R_4$ is a linear or branched alkyl radical $C_1$–$C_5$; $R_3$ and A are as above defined. Preferably A is an atom selected from Si or Ti. When A is Si preferably m=3 and $R_3$ is methyl or ethyl.

The preferred dispersing agents are selected from one or more of the following: vinyltriethoxysilane, 3-aminopropyltriethoxysilane, 3-chloroisobutyltriethoxysilane, 3-mercaptopropyltriethoxysilane, octyltriethoxysilane, diisopropoxytitanium bis-acetylacetonate.

The addition of the dispersing agents to the inorganic "fire retardants" is carried out at room temperature. Subsequently the mixture is heated at about 100° C. for one or more hours. The water necessary to hydrolyze the X groups in the above reported formula of the dispersing agents is supplied by the reaction medium or by the residual humidity of the organic solutions that contain the dispersing agents. The amount of the crosslinking agent component III) in the composition according to the present invention, as percentage by weight, is in the range 0.05–10.0%, preferably 0.1–5.0%, still more preferably 0.5–2.0%.

The crosslinking agents component III) of the composition object of the present invention are compounds containing at least two double bonds. For example they can be selected from the following: triallylisocyanurate (TAIC), triallylcyanurate (TAC), diallyl-isophthalate (U.S. Pat. No. 4,039,631), diallylterephthalate (U.S. Pat. No. 4,039,631), phenylindene esters (esters of phenyl indan) (U.S. Pat. No. 3,763,222), triallylester of the aryl-polycarboxylic acid (U.S. Pat. No. 3,840,619), bis-olefins such as for example 1,6 divinylperfluorohexane (U.S. Pat. No. 5,612,419) and others (U.S. Pat. No. 4,121,001), diacrylates and triacrylates.

The preferred crosslinking agent is triallylisocyanurate.

The optional ingredients component IV) of the composition according to the present invention are for example fillers (for example polytetrafluoroethylene (PTFE), silicates), lubricants, pigments, organic "fire retardants" compounds (for example halogenated compounds such as chloroparaffins, brominated polyesters, brominated epoxy oligomers), "intumescent agents", thermal stabilizers such as for example Irganox® 1010, Mark-260® (hindered phenols), Aclyn-316® (acid scavenger).

The amount of the optional component IV) is in the range 0–30% by weight based on the total weight of the composition.

The total sum of the percentages of components I), II), III) and IV) optional being the 100% by weight.

The preferred polymer compositions of the invention comprise the preferred components of I), II) and III).

Preferably the polymer composition has an elastic modulus lower than 1,000 MPa determined according to ASTM D1708 at 23° C. and therefore is a flexible polymer composition.

The following Examples illustrate the invention with non limitative purposes.

EXAMPLE 1

Example 1.1

Preparation of the E/CTFE/n-BuA Copolymer 40/55/5 Moles %

In a glass lined autoclave equipped with baffles and stirrer working at 450 rpm 5.3 l of demineralized water, 1.7 l of methyl alcohol, 20 ml of methylcyclopentane, 10 g of n-butylacrylate and 2 Kg of chlorotrifluoroethylene were introduced. Then the autoclave was heated to the reaction temperature of 15° C. and ethylene was fed up to a pressure of 8.2 absolute bar. In the autoclave the radical initiator under the form of a trichloroacetylperoxide (TCAP) solution in isooctane, having a titre of 0.1 g TCAP/ml, kept at −17° C., was then fed in a continuous way for the whole polymerization. 10 g of n-butylacrylate were furthermore introduced at consumption of 20, 40, 60, 80, 100, 120, 140, 160 and 180 g of ethylene, for a total amount of 100 g of n-butylacrylate, comprising the initially introduced amount.

The pressure was kept constant for the whole polymerization by continuously feeding ethylene into the reactor until a consumption of 200 g; a total amount of 399 ml of the initiator solution was fed into the autoclave. The polymerization lasted 555 minutes.

The product discharged from the autoclave was dried at 120° C. for about 16 hours. The amount of dry product was 1,200 g.

The polymer was additived with MARK-260® in an amount of 0.45% by weight and with an amount equal to 0.6% by weight of a dispersion of Aclyn-316® in water at 25% by weight. The obained mixture was dried at 85° C.

Example 1.2

Preparation of the Composition of the Invention.

A composition was prepared containing the following components, in amounts expressed as percentage by weight:

component I:
 91% of the additived polymer of Example 1.1;
 4% of plasticizer Plasthall®203;
component II:
 1% of zinc borate, treated with an amount equal to 2% by weight of a solution at 75% by weight of diisopropoxytitanium bis-acetylacetonate in isopropanol, then the mixture was dried at 100° C. for two hours;
 2% of zinc oxide (99.9% purity) in powder having particle diameter lower than 1 micron;
component III:
 1% of triallylisocyanurate (TAIC);
component IV:
 1% of PTFE (Polymist® F5A-EX).

The four components were mixed in a Henschel mixer for three minutes and then the composition was extruded in pellets in a twin-screw extruder Brabender with the barrel temperature at 230° C., and having an extrusion rate equal to 20 rpm.

The obtained composition has an elastic modulus of 720 MPa at 23° C. (ASTM D1708).

Example 1.3

Preparation of the Cable and Check of the Smoke Release According to the UL910 Steiner Tunnel Test.

The pellets obtained in Example 1.2 were extruded to jacket-cable on four pairs twisted copper wires covered with FEP.

Diameter of the extruder screw: 38.1 mm (1.5 in.); diameter/length ratio of the extruder=24:1; draw down ratio=13:1; draw down balance=1:1; extruder-temperature profile:

barrel: 182°–190° C.;
flange: 200° C.;
die: 215°–227° C.

The obtained cable was tested in the UL 910 Steiner Tunnel and the results were the following:

Average smoke: 0.08;
Peak smoke: 0.15.

Example 2 (Comparative)

Example 1 was repeated but omitting the addition of the component III) TAIC.

The obtained composition has an elastic modulus of 740 MPa at 23° C. (ASTM D1708).

The cable obtained with this composition was tested in the UL 910 Steiner Tunnel and the results were the following:

| Average smoke: | 0.12; |
| Peak smoke: | 0.21. |

The "Average smoke" and "Peak smoke" results of the cable prepared according to the composition of comparative Example 2 are therefore higher than the corresponding values obtained with the cable prepared with the polymer composition of the invention (Example 1.3). This shows that by adding a crosslinking agent component III) to a composition formed by fluoropolymers, optionally containing plasticizers as above defined for component I), by inorganic fire-retardants and by other optional additives, the smoke suppressant properties are improved.

What is claimed is:

1. A polymer composition formed by:
 I) fluoropolymers selected from one or more of the following:
  copolymer based on ethylene, TFE and/or CTFE, modified with hydrogenated monomers having one double bond, or blends of these fluoropolymers with homopolymers of CTFE or (co)polymers based on CTFE (PCTFE) containing at least 99% by moles of CTFE, the complement to 100 being one or more fluorinated monomers or hydrogenated monomers; said fluoropolymers and/or the corresponding blends optionally mixed with hydrogenated plasticizers;
 II) one or more inorganic fire-retardants, optionally treated with dispersing agents;
 III) one or more crosslinking agents; and
 IV) optional additives selected from fillers, intumescent agents, pigments, lubricants, organic fire-retardants and thermal stabilizers;
 the total sum of the percentages of components I), II), III) and optional IV) being 100% by weight.

2. A polymer composition according to claim 1, wherein the fluoropolymers of component I) are formed of the following monomers:
 (a) ethylene from 10 to 70% by moles;
 (b) a fluorinated monomer selected from tetrafluoroethylene, chlorotrifluoroethylene, or mixtures thereof, in a percentage by moles in the range 30–90%; and
 (c) from 0.1 to 30% by moles with respect to the total amount of (a)+(b), of a hydrogenated monomer of formula:

wherein $R_1 = -OR_2$, $-(O)_t CO (O)_p R_2$ wherein t and p are integers equal to 0 or 1, and $R_2$ is a hydrogenated radical from 1 to 20 carbon atoms, linear and/or branched, or cycloalkyl, $C_1$–$C_{20}$ alkyl radical, or $R_2$ is H; the $R_2$ radical optionally contains:
 heteroatoms; one or more functional groups; and double bonds; and n is an integer in the range 0 to 10.

3. A polymer composition according to claim 2, wherein the comonomers (c) are selected from the following classes:

1) Acrylic monomers of formula:

$$CH_2=CH-CO-O-R_2$$

wherein $R_2$ is as defined above;

2) Vinylether monomers of formula:

$$CH_2=CH-O-R_2$$

wherein $R_2$ is as defined above;

3) Vinyl monomers of the carboxylic acid of formula:

$$CH_2=CH-O-CO-R_2$$

wherein $R_2$ is as defined above; and

4) Unsaturated carboxylic acids of formula:

$$CH_2=CH-(CH_2)_n-COOH$$

wherein n is an integer in the range 0 to 10.

4. A polymer composition according to claim 3, wherein the comonomers (c) are selected from:
ethylacrylate, n-butylacrylate, acrylic acid, hydroxyethylacrylate, hydroxypropylacrylate, (hydroxy)ethylhexylacrylate, acryl(N-alkyl)amide wherein alkyl is $C_1$-$C_5$;
propylvinylether, cyclohexylvinylether, vinyl-4-hydroxybutylether;
vinyl-acetate, vinylpropionate, vinyl-2-ethylhexanoate; and
vinylacetic acid.

5. A polymer composition according to claim 1, wherein the PCTFE percentage in the blends of component I) is in the range of 1–75% by weight.

6. A polymer composition according to claim 5, wherein the PCTFE is a OTFE homopolymer.

7. A polymer composition according to claim 1, wherein the percentage by weight of the hydrogenated plasticizers of the total weight of the composition is in the range of 0.1–10%.

8. A polymer composition according to claim 1, wherein the fire-retardants of component II) are inorganic compounds and their percentage by weight is in the range 0.1–35% based on the total weight of the composition.

9. A polymer composition according to claim 8, wherein the fire-retardants are selected from inorganic phosphates, metal oxides, tin oxalates, boron compounds, and metal hydroxides.

10. A polymer composition according to claim 8, wherein the component II) is treated with dispersing agents.

11. A polymer composition according to claim 10, wherein the dispersing agent in monomeric or oligomeric form, has the following structure:

$$(R_3)_{4-m}A(X)_m$$

wherein m=1–3; X is an hydrolyzable group; $R_3$ is an alkyl $C_1$-$C_5$ and/or aryl radical $C_6$-$C_{15}$ wherein the radical $R_3$ optionally contains: unsaturations; one or more heteroatoms selected from O, N, S, Cl; functional groups; and A is an atom selected from among Si, Ti or Zr.

12. A polymer composition according to claim 11, wherein the dispersing agents are selected from one or more of the following: vinyltriethoxysilane, 3-aminopropyl-triethoxysilane, 3-chloroisobutyltriethoxysilane, 3-mercaptopropyl-triethoxysilane, octyltriethoxysilane, and diisopropoxytitanium bis-acetylacetonate.

13. A polymer composition according to claim 1, wherein the amount of the crosslinking agent component III), expressed as percentage by weight, is in the range of 0.05–10.0%.

14. A polymer composition according to claim 13, wherein the crosslinking agent contains at least two double bonds.

15. A polymer composition according to claim 13, wherein said crosslinking agent is selected from the following: triallylisocyanurate (TAlC), triallyllcyanurate (TAO), diallyl-isophthalate, diallylterephthalate, phenylindene esters, triallylester of the aryl-polycarboxylic acid, and bis-olefins.

16. A polymer composition according to claim 1, wherein the amount of optional component IV) is in the range of 0–30.0% by weight based on the total weight of the composition.

17. A polymer composition according to claim 16, wherein the optional ingredients of component IV) are fillers, lubricants, pigments, intumescent agents, and thermal stabilizers.

18. A polymer composition according to claim 1, having an elastic modulus lower than 1,000 MPa determined according to ASTM D1708 at 23° C.

19. A manufactured article comprising the polymer composition according to claim 1.

20. The manufactured article according to claim 19 wherein the article is a flexible cable.

21. The polymer composition according to claim 2, wherein the fluoropolymers of component I) are formed of the following monomers:
(a) ethylene from 35 to 55% by moles;
(b) a fluorinated monomer selected from tetrafluoroethylene, chlorotrifluoroethylene, or mixtures thereof, in a percentage by moles in the range of 45–65%; and
(c) from 1 to 15% by moles with respect to the total amount of (a)+(b), of a hydrogenated monomer of formula:

$$CH_2=CH-(CH_2)_n-R_1 \quad (I)$$

wherein $R_1=-OR_2$, $-(O)_tCO(O)_pR_2$ wherein t and p are integers equal to 0 or 1, and $R_2$ is a hydrogenated radical from 1 to 20 carbon atoms, linear and/or branched, or cycloalkyl, $C_1$-$C_{20}$ alkyl radical and wherein the $R_2$ radical optionally contains Cl, O, N heteroatoms; one or more functional groups selected from OH, COOH, epoxide, ester and ether; double bonds; and n is an integer in the range of 0 to 10.

22. The polymer composition according to claim 5, wherein the PCTFE percentage in the blends of component I) is in the range of 5–30% by weight.

23. The polymer composition according to claim 7 wherein the percentage by weight of the hydrogenated plasticizers of the total weight of the composition is in the range of 0.5–5%.

24. The polymer composition according to claim 8, wherein the fire-retardants of component II) are inorganic compounds and their percentage by weight is in the range of 0.5–15% based on the total weight of the composition.

25. The polymer composition according to claim 9 wherein the metal oxide is zinc oxide and the boron compound is zinc borate.

26. The polymer composition according to claim 11 wherein the dispersing agent in monomeric or oligomeric form, has the following structure:

$$(R_3)_{4-m}A(X)_m$$

wherein m=2 or 3; X is an alkoxy group $OR_4$ wherein $R_4$ is a linear or branched alkyl radical $C_1$–$C_5$; and $R_3$ is an alkyl $C_1$–$C_5$ and/or aryl radical $C_6$–$C_{15}$ wherein the radical $R_3$ optionally contains amines, epoxide, —SH, —OH, —$CONH_2$, carboxyl or salified carboxyl and A is as defined above.

27. The polymer composition according to claim 13, wherein the amount of the crosslinking agent component III) expressed as percentage by weight, is in the range of 0.1–5.0%.

28. The polymer composition according to claim 27, wherein the amount of the crosslinking agent component III), expressed as percentage by weight, is in the range of 0.5–2.0%.

29. The polymer composition according to claim 15, wherein said crosslinking agent is 1,6-divinylperfluorohexane.

30. The polymer composition according to claim 17, wherein the filler is polytetrafluoroethylene (PTFE).

* * * * *

UNITED STATES PATENT AND TRADEMARK OFFICE
CERTIFICATE OF CORRECTION

PATENT NO.   : 6,673,866 B2
DATED        : January 6, 2004
INVENTOR(S)  : Mikhail Zolotnitsky and Julio A. Abusleme It is certified that error appears in the above-identified patent and that said Letters Patent is hereby corrected as shown below:

Column 6,
Line 29, "TEE and/or OTFE," should read -- TFE and/or CTFE, --.
Line 33, "(POTFE)" should read -- (PCTFE) --.
Line 59, "$CH_2=CH-(CH_2)_{n}-R_1$ (I)" should read -- $CH_2=CH-(CH_2)_{n}-R_1$ (I) --.

Column 7,
Line 39, "OTFE" should read -- CTFE --.

Column 8,
Line 12, "(TAlC)," should read -- (TAIC), -- , and "(TAO)," should read -- (TAC), --.

Signed and Sealed this

Ninth Day of March, 2004

JON W. DUDAS
*Acting Director of the United States Patent and Trademark Office*